United States Patent [19]

Grossi et al.

[11] 4,384,099

[45] May 17, 1983

[54] CATIONIC AMINE MODIFIED ASPHALT COMPOSITIONS

[75] Inventors: Anthony V. Grossi, Newark; Leon A. Hagelee, Minerva Park; Louis T. Hahn; Alfred Marzocchi, both of Newark, all of Ohio

[73] Assignee: Owens-Corning Fiberglas Corporation, Toledo, Ohio

[21] Appl. No.: 329,901

[22] Filed: Dec. 11, 1982

[51] Int. Cl.$^3$ .................... C08F 289/00; C08G 83/00; C08H 5/00
[52] U.S. Cl. ..................................... 527/500; 525/54.5
[58] Field of Search ....................... 527/500; 525/54.5; 106/273 W

[56] References Cited

U.S. PATENT DOCUMENTS

| | | | |
|---|---|---|---|
| 2,570,185 | 4/1947 | Aldrich | 260/28 |
| 2,716,616 | 8/1955 | Rendall et al. | 106/273 |
| 2,888,407 | 5/1959 | Cooper et al. | 527/500 |
| 3,097,179 | 7/1963 | Ceintrey | 260/28.5 |
| 3,303,151 | 2/1967 | Peters et al. | 260/28.5 |
| 3,497,371 | 2/1970 | Chang | 106/277 |
| 3,547,850 | 12/1970 | Montgomery | 252/311.5 |
| 3,728,278 | 4/1973 | Tramelli | 252/311.5 |
| 3,997,354 | 12/1971 | Pivette et al. | 106/273 |
| 4,038,102 | 7/1977 | Hellsten et al. | 106/273 N |
| 4,041,712 | 8/1977 | Stepien et al. | 61/36 R |
| 4,166,752 | 9/1979 | Marzocchi et al. | 106/273 N |
| 4,172,046 | 10/1979 | Doi et al. | 252/311.5 |
| 4,273,685 | 6/1981 | Marzocchi et al. | 427/389.8 |

*Primary Examiner*—Theodore Morris
*Attorney, Agent, or Firm*—Ronald C. Hudgens; Robert F. Rywalski

[57] ABSTRACT

Cationic chemically modified asphalts are prepared by reacting asphalt, a vinyl aromatic monomer and an amine derivative of a fatty acid. These asphalts are useful for road construction, repair and maintenance as well as a coating for various substrates including cementitious substrates, glass and metal.

8 Claims, No Drawings

CATIONIC AMINE MODIFIED ASPHALT COMPOSITIONS

CROSS-REFERENCES

The present application is related to application U.S. Ser. No. 329,897 and U.S. Ser. No. 329,900, all of which are concurrently being filed.

TECHNICAL FIELD

The present invention relates to asphalt compositions, and more particularly it relates to chemically modified asphalt compositions. Even yet more particularly, the present invention relates to amine modified asphalts.

BACKGROUND, SUMMARY AND INDUSTRIAL EXPLOITATION

Asphalt has been employed for numerous and wide variety of applications for many years. One of the problems encountered with asphalt is that its adhesion to various substrates and especially to aggregate needs to be improved. Such aggregate is represented, for example, by gravel, crushed rock, slag, sand and crushed limestone. Additionally, the adhesion of asphalt needs to be improved with respect to other material such as, for example, cementitious materials, metals, glass and the like.

The above deficiencies in asphalt are satisfied by providing as a composition of matter the product produced by reacting asphalt with a vinyl aromatic monomer and an amine of an acyclic unsaturated hydrocarbon.

Some of the desirable properties of the present compositions include improved coating of, and adhesion to, negatively charged surfaces such as aggregate, metals, cements and glass, less stripping of these compositions from such surfaces due to water, weathering and mechanical forces, and self-emulsification characteristics. These compositions will find utility for a wide variety of purposes. They, for example, will find application in the highway and bridge construction, repair and maintenance areas as, for example, crack and pothole fillers, joint sealers, and water resistant membranes, as well as cut-backs with the compositions being used alone or as blends with conventional asphalts. These compositions can be formed into emulsions either with or without emulsifiers to form rapid set emulsions, having utility for chip and seal applications, or as a cold overlay. Generally, these compositions are self-emulsifying, but if desired conventional emulsifiers may be employed, preferably non-ionic surfactants. The compositions may also be employed as corrosion resistant and/or water resistant coatings for metals and as coatings and/or impregnants for glass, especially glass fibers. Such coated or impregnated glass fibers will show outstanding compatibility with conventional asphalt and consequently will serve as outstanding reinforcements for such asphalts.

DESCRIPTION

As indicated above, the compositions of the present invention are produced by reacting asphalt with a vinyl aromatic monomer and an amine of an acyclic unsaturated hydrocarbon. The reacting is done by heating at elevated temperature for several hours. Preferably, the reacting is done by heating at a temperature of at least 120° C. for at least 10 hours, and most desirably, at a temperature of about 120° C. to about 180° C. for about 20 to 24 hours. It is believed that the constituents are all chemically integrated because of the double bond unsaturation existing in the vinyl aromatic monomer along with the unsaturation present in the acyclic hydrocarbon amine and, of course, with the unsaturation which is known to be present in asphalt. Consequently, it is believed that these double bond sites provide reactive sites for chemical integration of the constituents.

The amines employed in the present invention are amines of unsaturated, acyclic hydrocarbons. The unsaturation in these compounds provides reactive sites for chemically integrating the amines into the compositions and the amine functionality provides the desired polarity, or functionality, so as to form cationic compositions which will exhibit tenacious bonding to aggregate commonly employed in the highway maintenance and repair industry, as well as cementitious and other substrates. Preferably, the hydrocarbon portion of the amine will contain 8 to 25 carbon atoms. Thus, the hydrocarbon can include such groups as alkenyl, alkadienyl, alkatrienyl, alkatetraenyl, and alkapentaenyl radicals. The preferred hydrocarbon radicals wll be found to be octadecenyl radicals, for example a 9 octadecenyl radical or octadecadienyl radicals, for example a 9,12 octadecadienyl radical or octadecatrienyl radicals, for example the 9,12,15 octadecatrienyl radical. Representative of other suitable amines include: the decenyl amines, for example 9 decenyl amine; decadienyl amines, for example 2,4 decadienyl amine; dodecenyl amine, for example 9 dodecenyl amine; hexadecenyl amine, for example 9 hexadecenyl amine; 9,11,13,15 octadecatetraenyl amine; 6,9,12,15 octadecatetraenyl amine; 9,11,13 octadecatrienyl amine; 9,12,15 octadecatrienyl amine; 6 octadecenyl amine; 11 octadecenyl amine; eicosenyl amines, for example 9 eicosenyl amine and 11 eicosenyl amine; eicosatetraenyl amines, for example 8,11,14,17 eicosatetraenyl amine and 5,8,11,14 eicosatetraenyl amine; eicosapentaenyl amines like 5,8,11,14,17 eicosapentaenyl amine; docosenyl amines, for example 11,13 docosenyl amine; docasapentaenyl amines, for example 7,10,13,16,19 docasapentaenyl amine; and tetracosenyl amines, for example, 15 tetracosenyl amine. Of course, it will be appreciated that mixtures of such unsaturated acyclic hydrocarbon amines may be employed, and in fact in a preferred mode of practicing the present invention, such a mixture is employed.

The above-indicated amines are commercially available. One suitable source for such amines is the Humko Chemical division of Witco Chemical Company, which supplies these amines under the trade name Kemamine. Those amines are manufactured by converting fatty acids to nitriles followed by reduction, for example, by hydrogenation, to the amines. Thus, as will be apparent, these amines may also be viewed upon as derivatives of fatty acids. Thus, the preferred amines as indicated above may be viewed upon as oleyl amine, linoleyl amine, and linolenyl amine, or mixtures thereof. Suitable amines which are commercially available are represented by Kemamine P-997, P-997D, and P-999. These amines generally have melting point ranges varying between about 10° C. to about 60° C., with the preferred amines, indicated above, having melting point ranges between about 15° C. to about 26° C. If desired, saturated acyclic hydrocarbon amines may also be employed, for example, those having 8 to 25 carbon atoms in the hydrocarbon chain. In fact, the preferred amines, namely P-997, P997D and P-999, are mixtures of several unsaturated acyclic hydrocarbon amines and saturated acyclic hydrocarbon amines. For example, P-999 amine contains approximately 57% by weight of oleyl amine, 15% by weight linoleyl amine, 7% by weight of linolenyl amine, about 2% by weight of gadoleyl amine, 15% by weight of palmityl amine, and 4% by weight of stearyl amine. The P-997 and P-997D amines contain about 45% by weight of oleyl amine, 30% by weight linoleyl amine, about 15% by weight of palmityl amine, and about 10% by weight of stearyl amine. The above-indicated commercially available amines are typically about 93% to about 97% amine by weight.

Asphalt materials which are suitable preferably are those typically used for road paving, repair and maintenance purposes. Thus, asphalt includes natural asphalt, petroleum asphalt and petroleum tar. The natural asphalts include, for example, asphaltite, such as Gilsonite, grahamite and glancepitch, lake asphalt, such as Trinidad asphalt, and rock asphalt. The petroleum asphalt that may be used includes straight asphalt obtained by distillation of a crude oil, blown asphalt, produced by blowing an oxygen-containing gas into straight asphalt, and solvent extracted asphalt. The petroleum tar that may be used includes coal tar and oil gas tar. Tar pitch is equally suitable. Additionally, the asphalts can be those that have been blown with steam, ammonia, or amines of the type set forth in U.S. Pat. No. 4,166,752. Preferably, the asphalt which will be employed is an asphalt cement of the type typically used for road paving, repair and maintenance purposes, such as for example, the AC-5, AC-10, AC-20 grades. Such asphalts typically have penetrations ranging between about 20 to about 200.

As the polymerizable vinyl monomer, use is preferably made of a monofunctional vinyl aromatic monomer having the general formula:

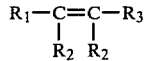

wherein $R_1$ is an aromatic group containing 6 to 12 carbon atoms, including a phenyl group, a substituted phenyl group wherein the substituent is any one of an amino group, a cyano group, a halogen group, a $C_1$ to $C_3$ alkoxy group, a $C_1$ to $C_3$ alkyl group, a hydroxy group, a nitro group, etc. $R_2$ is preferably hydrogen or lower alkyl e.g., a $C_1$ to $C_5$ alkyl and $R_3$ is hydrogen, lower alkyl or one of the following groups:

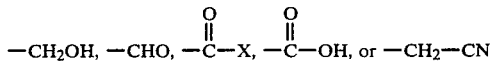

wherein X is halogen, and preferably chlorine or bromine. Styrene is preferred. In conjunction with the vinyl aromatic monomer as described above, a polyfunctional vinyl aromatic monomer containing 6 to 12 carbon atoms in the aromatic ring and two or more polymerizable vinyl groups chemically bonded to the aromatic ring can be employed. Preferred polyfunctional monomers are those having the general formula:

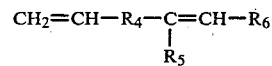

wherein $R_4$ is a divalent aromatic group containing 6 to 12 carbon atoms, and preferably a phenylene group; and, $R_5$ and $R_6$ have the same meaning as is described above with respect to $R_2$ and $R_3$, respectively for the monofunctional vinyl aromatic monomer. Illustrative of a suitable polyfunctional vinyl aromatic monomer is divinyl benzene. When use is made of a polyfunctional vinyl aromatic monomer in combination with a monofunctional vinyl aromatic monomer, such as styrene, generally the monofunctional monomer is present in a ratio of about 1:1 to 40:1 based on the weight of the polyfunctional vinyl aromatic monomer.

The amounts of the ingredients employed may vary over a wide range, but in general, it will be preferred to employ the vinyl aromatic monomer in an amount of about 1% to about 10% based on the weight of asphalt and to employ the acyclic unsaturated hydrocarbon amine in an amount of about 2% to about 10% based on the weight of asphalt. Most desirably, the vinyl aromatic monomer will be about 2% to about 5% and the amine about 5% to about 7%.

While the above describes the present invention, the following more fully illustrates the manner of forming the compositions of the present invention.

EXAMPLE

A formulation of approximately 90.6% by weight of AC-20 asphalt, about 3.1% by weight styrene, and about 6.3% by weight of Kemamine P-999 are employed. The asphalt is charged into a reactor (provided with an agitator and reflux condenser) and heated to approximately 110° C. at which point the styrene is added. Upon completion of the styrene addition, the Kemamine P-999 is added while heating the reactor to approximately 150° C. With agitation and under reflux, the mixture is then reacted by heating at 150° C. for about 24 hours after which the product is recovered and cooled. The product is outstandingly adapted for any of the numerous uses set forth above.

While the above describes the present invention, it will, of course, be apparent that modifications are possible which pursuant to the patent statutes and laws do not depart from the spirit and scope thereof.

We claim:
1. As a composition of matter, the product produced by reacting asphalt with a vinyl aromatic monomer and an amine of an acyclic unsaturated hydrocarbon.
2. The composition of claim 1 wherein said amine is at least one member selected from the group consisting of oleyl amine, linoleyl amine and linolenyl amine.
3. The composition of claim 1 wherein said hydrocarbon contains 8 to 25 carbon atoms.
4. As a composition of matter asphalt which has been reacted with styrene and an acyclic unsaturated hydrocarbon amine by heating at a temperature of at least about 120° C. for at least about 10 hours.
5. The composition of claim 1 wherein said reacting is done by heating at an elevated temperature for several hours.
6. The composition of claim 2 wherein said vinyl aromatic monomer is styrene.
7. The composition of claim 4 wherein said temperature is about 120° C. to about 180° C.
8. The composition of claim 7 wherein said time is about 20 to about 24 hours.

* * * * *

UNITED STATES PATENT AND TRADEMARK OFFICE
CERTIFICATE OF CORRECTION

PATENT NO. : 4,384,099

DATED : May 17, 1983

INVENTOR(S) : Anthony V. Grossi/Leon A. Hagelee/
Louis T. Hahn/Alfred Marzocchi

It is certified that error appears in the above-identified patent and that said Letters Patent is hereby corrected as shown below:

Filing date is incorrect - should be December 11, 1981 rather than December 11, 1982.

*Signed and Sealed this*

*Ninth* Day of *October 1984*

[SEAL]

Attest:

GERALD J. MOSSINGHOFF

*Attesting Officer*   *Commissioner of Patents and Trademarks*